US011933078B2

(12) United States Patent
Rivera

(10) Patent No.: US 11,933,078 B2
(45) Date of Patent: Mar. 19, 2024

(54) RESTRAINING DEVICE

(71) Applicant: Alberto Rivera, Vineland, NJ (US)

(72) Inventor: Alberto Rivera, Vineland, NJ (US)

(*) Notice: Subject to any disclaimer, the term of this patent is extended or adjusted under 35 U.S.C. 154(b) by 545 days.

(21) Appl. No.: 17/168,339

(22) Filed: Feb. 5, 2021

(65) Prior Publication Data

US 2022/0251884 A1 Aug. 11, 2022

(51) Int. Cl.
*E05B 75/00* (2006.01)

(52) U.S. Cl.
CPC .................................... *E05B 75/00* (2013.01)

(58) Field of Classification Search
CPC ............................... E05B 75/00; E05B 75/005
USPC .............................................................. 70/16
See application file for complete search history.

(56) References Cited

U.S. PATENT DOCUMENTS

| | | | | |
|---|---|---|---|---|
| 5,099,662 A * | 3/1992 | Tsai | E05B 75/00 70/16 |
| 5,443,155 A | 8/1995 | Robinson | |
| D366,129 S | 1/1996 | Escoe, III | |
| 6,334,444 B1 | 1/2002 | Sisco | |
| 7,284,399 B1 | 10/2007 | Sisco | |
| 7,866,321 B2 | 1/2011 | DePetrillo | |
| 10,294,698 B1 * | 5/2019 | Bartak | E05B 75/00 |
| 2004/0216281 A1 | 11/2004 | Starrett | |
| 2009/0077773 A1 * | 3/2009 | Harrington | E05B 75/00 24/16 PB |
| 2014/0196257 A1 * | 7/2014 | Entwistle | E05B 75/00 24/16 R |
| 2015/0107311 A1 * | 4/2015 | Parsons | E05B 75/00 70/16 |

* cited by examiner

*Primary Examiner* — Nathan Cumar

(57) ABSTRACT

A restraining device that can be positioned and secured using one hand includes a housing, a strap, a handle, and a locking unit. The housing has a pair of apertures positioned singly in front and rear ends thereof. The strap, which has a first end engaged to the housing, extends from the housing loopedly back through the pair of apertures to define a loop. A second end of the strap is external to the housing. The handle is engaged to the strap proximate to the second end. Hands of a person can be inserted into the loop so that the strap is positioned around wrists of the person. A user is positioned to pull on the handle to tighten the strap around the wrists. The locking unit, which is engaged to and positioned in the housing, can selectively engage the strap to prevent expansion of the loop.

11 Claims, 5 Drawing Sheets

RESTRAINING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to restraining devices and more particularly pertains to a new restraining device that can be positioned and secured using one hand.

(2) Description of Related Art Including Information Disclosed Under 37 CFR 1.97 and 1.98

The prior art relates to restraining device, which may comprise dual loop straps and motorized chains.

BRIEF SUMMARY OF THE INVENTION

An embodiment of the disclosure meets the needs presented above by generally comprising a housing, a strap, a handle, and a locking unit. The housing defines an interior space and has a pair of apertures positioned therein. The apertures are positioned singly in a front end and a rear end of the housing. The strap, which has a first end engaged to the housing, extends from the housing loopedly back through the pair of apertures to define a loop. A second end of the strap is external to the housing. The handle is engaged to the strap proximate to the second end and is configured to be grasped in a hand of a user. The loop is configured for insertion of hands of a person so that the strap is positioned around wrists of the person. The user is positioned to pull on the handle to tighten the strap around the wrists of the person. The locking unit is engaged to the housing, positioned in the interior space, and is configured to selectively engage the strap to prevent expansion of the loop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
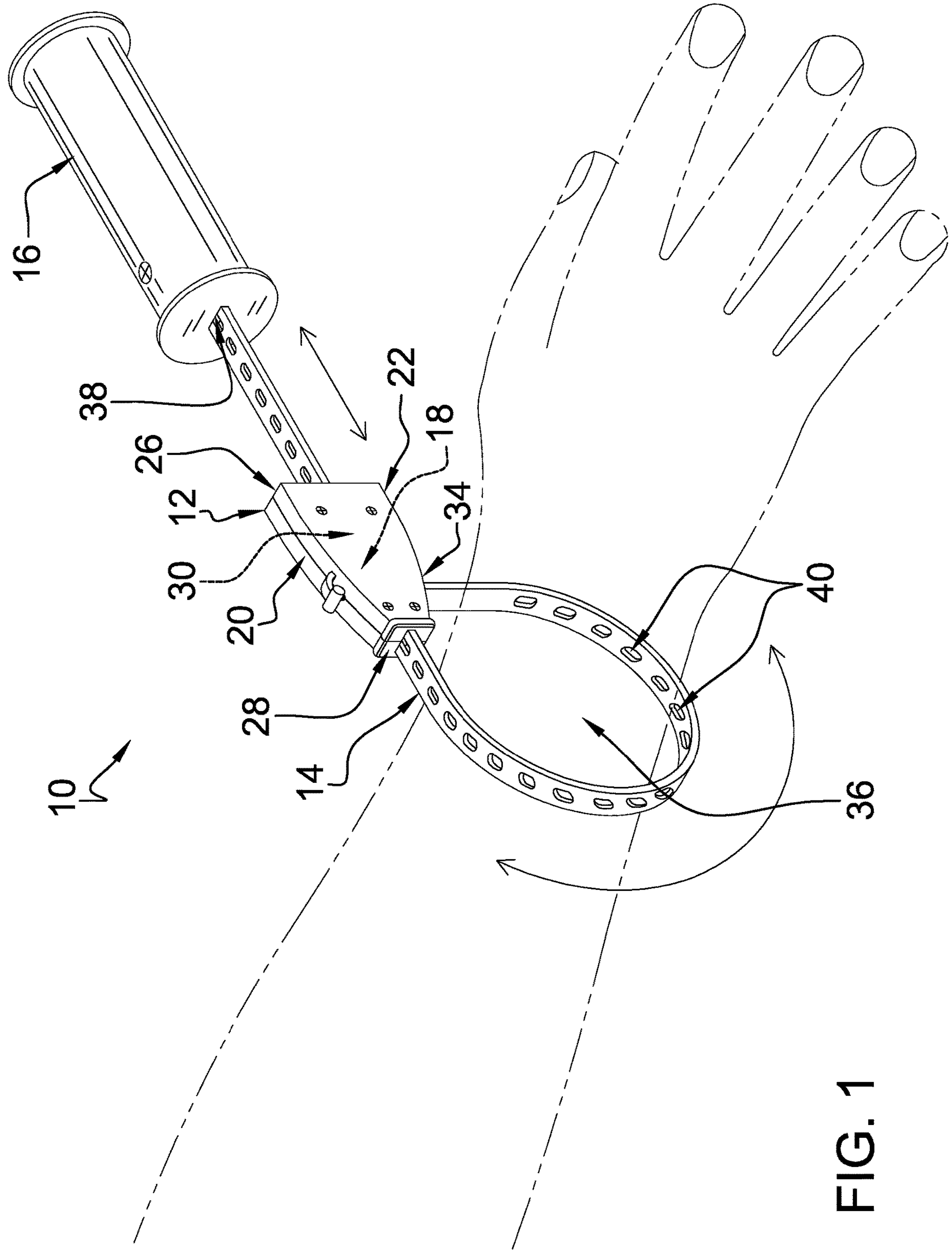
FIG. 1 is an in-use view of a restraining device according to an embodiment of the disclosure.

With reference now to the drawings, and in particular to FIGS. 1 through 6 thereof, a new restraining device embodying the principles and concepts of an embodiment of the disclosure and generally designated by the reference numeral 10 will be described.

As best illustrated in FIGS. 1 through 6, the restraining device 10 generally comprises a housing 12, a strap 14, a handle 16, and a locking unit 18. The housing 12 has a top 20, a bottom 22, opposed sides 24, a rear end 26, and a front end 28. The opposed sides 24 taper from proximate to the rear end 26 to the front end 28 so that the front end 28 is circumferentially smaller than the rear end 26.

The housing 12 defines an interior space 30 and has a pair of apertures 32 positioned therein. The apertures 32 are positioned singly in the front end 28 and the rear end 26 of the housing 12. The strap 14, which has a first end 34 engaged to the housing 12, extends from the housing 12 loopedly back through the pair of apertures 32 to define a loop 36. A second end 38 of the strap 14 is external to the housing 12. The strap 14 may comprise plastic, or other flexible material, such as, but not limited to, metal chain, leather, and the like.

Figure 4:
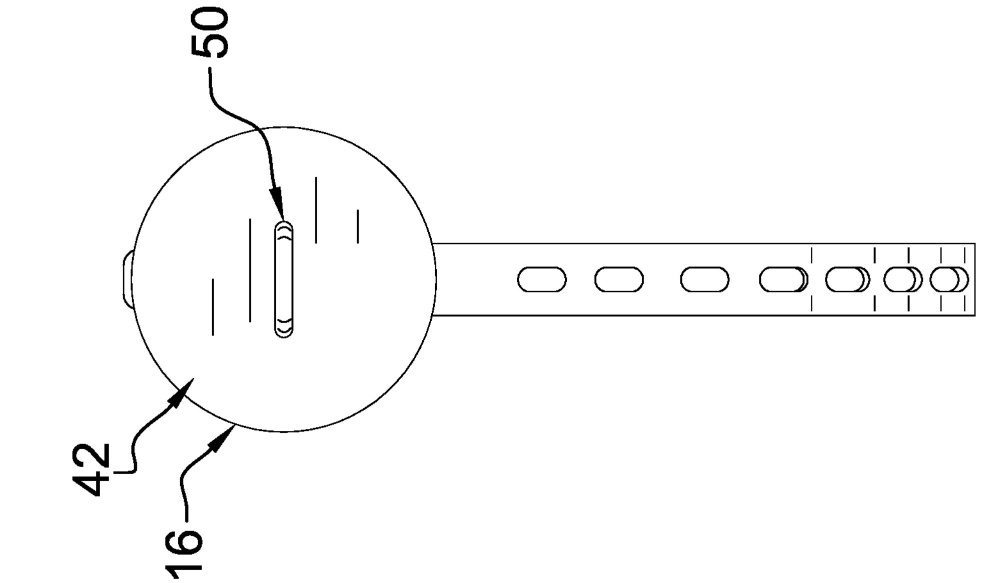
FIG. 4 is a rear view of an embodiment of the disclosure.
Figure 3:
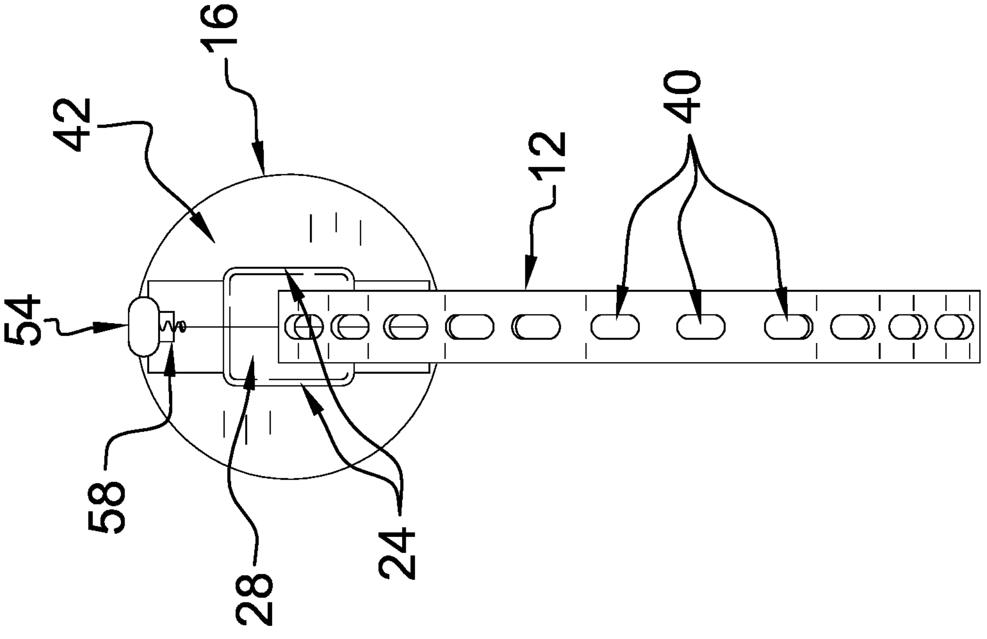
FIG. 3 is a front view of an embodiment of the disclosure.
Figure 5:
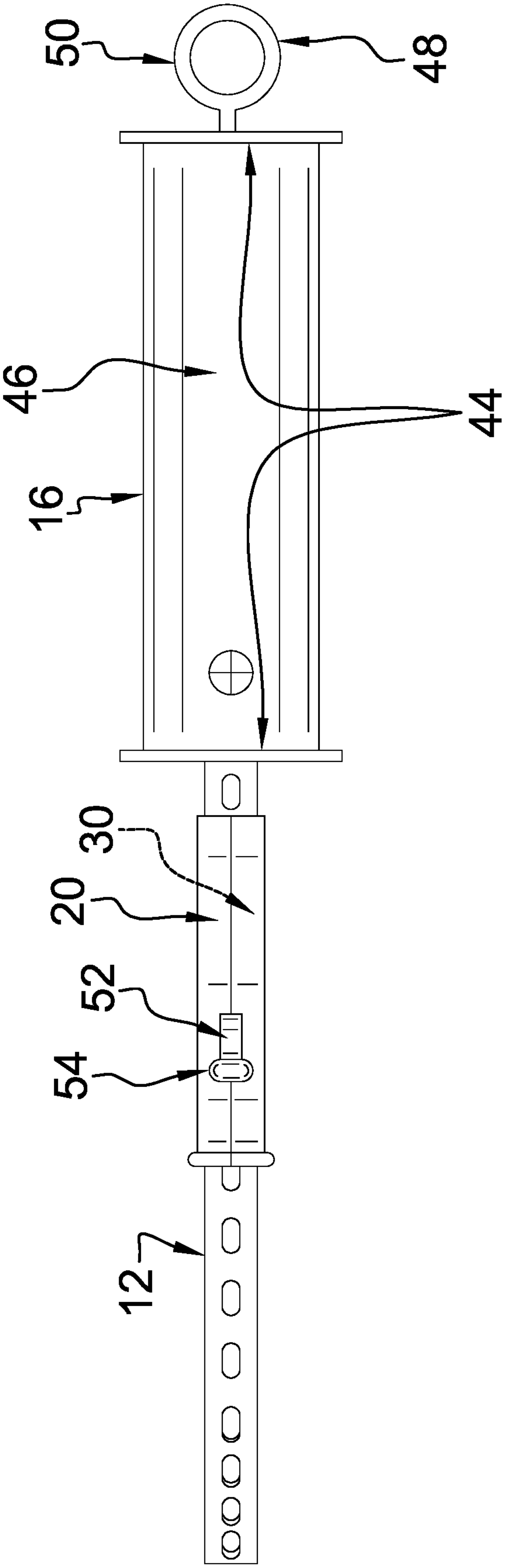
FIG. 5 is a top view of an embodiment of the disclosure.
Figure 6:
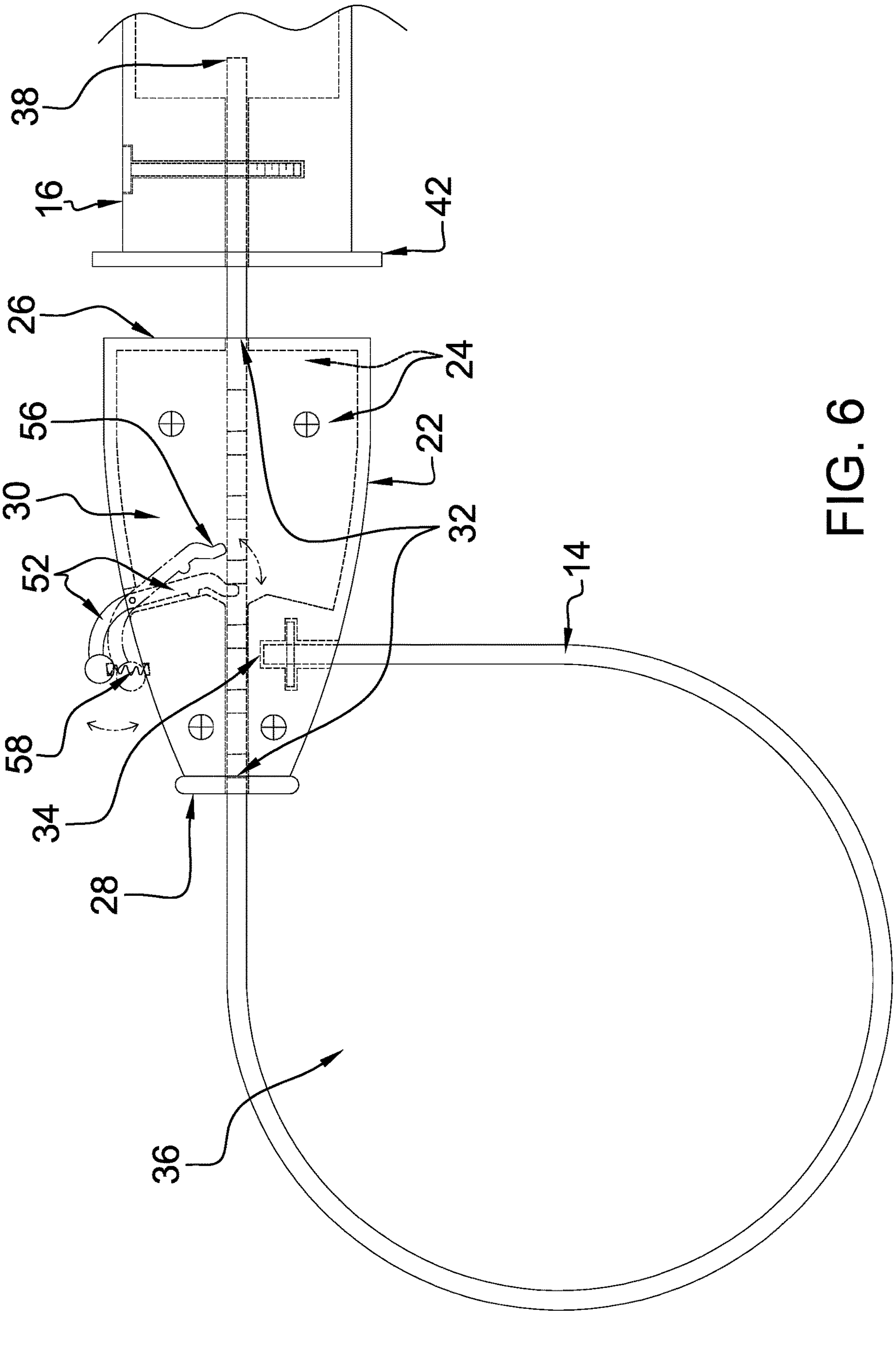
FIG. 6 is a detail view of an embodiment of the disclosure.

The strap 14 has a plurality of holes 40 positioned therethrough. The plurality of holes 40 extends from proximate to the first end 34 and the second end 38. Each hole 40 may be ovally shaped, as shown in FIGS. 3 and 4, or alternatively shaped, such as, but not limited to, ovally shaped, squarely shaped, and the like.

The handle 16 is engaged to the strap 14 proximate to the second end 38 and is configured to be grasped in a hand of a user. The handle 16 may be cylindrically shaped, as shown in FIG. 1, or alternatively shaped, such as, but not limited to, bar shaped, ring shaped, and the like.

Each of a pair of plates 42 is engaged to a respective opposed end 44 of the handle 16. The plates 42 are configured to deter slippage of the hand of the user off of the handle 16. A grip 46 is engaged to the handle 16 and is configured to enhance a grasp of the hand of the user upon the handle 16. The grip 46 comprises rubber, silicone, or elastomer.

Figure 2:
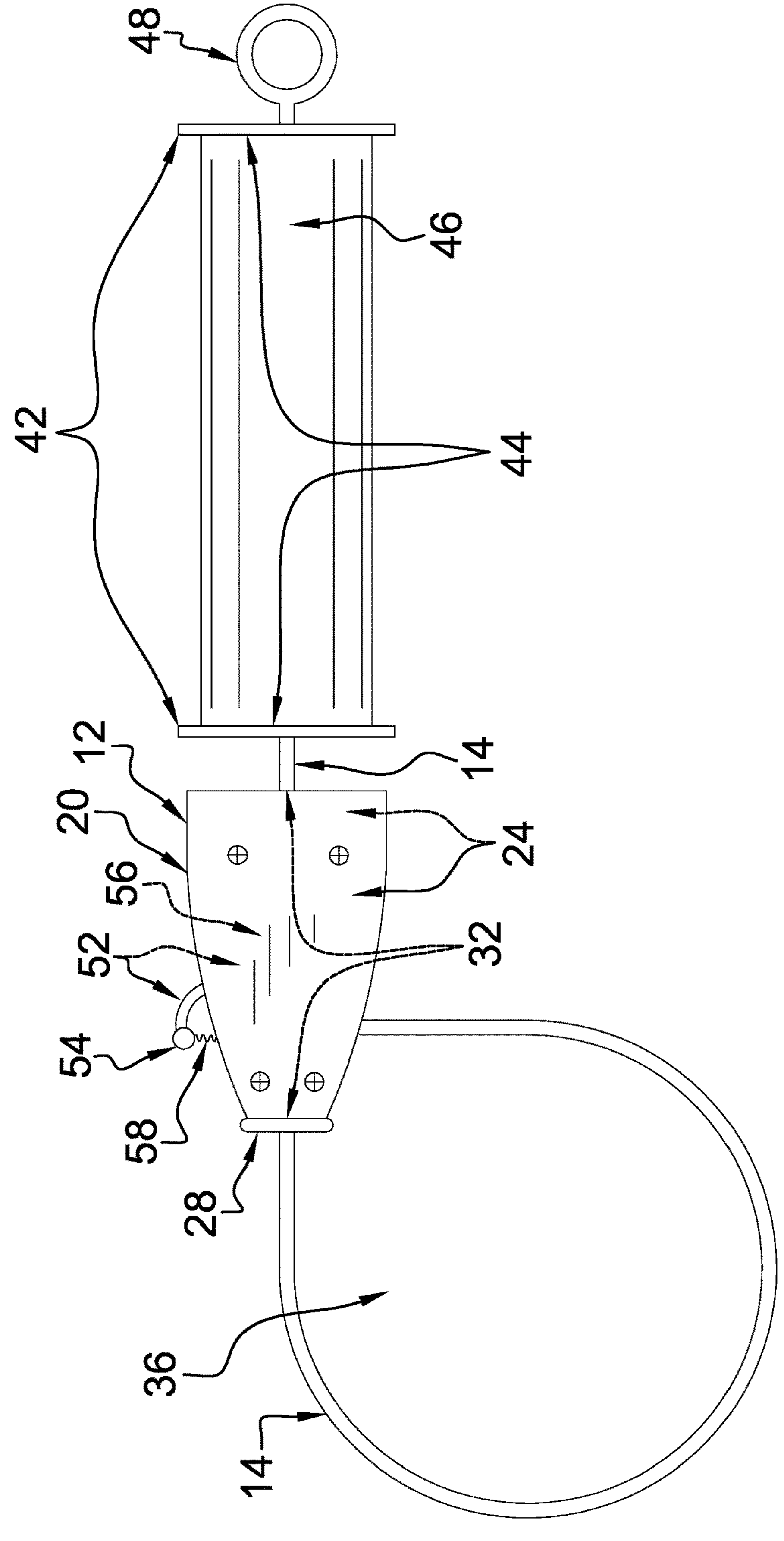
FIG. 2 is a side view of an embodiment of the disclosure.

A connector 48 is engaged to the handle 16 and is configured to selectively engage a coupler positioned on the user. The connector 48 enables the user to attach the device 10 to a belt, harness, or the like, so that it is retained on the user and ready for use. The connector 48 may comprise an eyebolt 50, as shown in FIG. 2, or other connecting means, such as, but not limited to, hook and loop fasteners, clips, and the like.

The locking unit 18 is engaged to the housing 12, positioned in the interior space 30, and is configured to selectively engage the strap 14 to prevent expansion of the loop 36. The loop 36 is configured for insertion of hands of a person so that the strap 14 is positioned around wrists of the person. The user is positioned to pull on the handle 16 to tighten the strap 14 around the wrists of the person.

The locking unit 18 comprises an arm 52, which is hingedly engaged to the housing 12. A first terminus 54 of the arm 52 is external to the housing 12. A second terminus 56 of the arm 52 is positioned in the interior space 30 and to selectively insert into a respective hole 40 of the plurality of holes 40. The arm 52 has a spring 58 engaged thereto. The spring 58 may be external to the housing 12, as shown in FIG. 2. The present invention also anticipates the spring 58 being positioned in the interior space 30.

The arm 52 hinges as the strap 14 slides through the housing 12 by action of the user pulling the handle 16, concurrent with tensioning of the spring 58. The spring 58 is positioned to rebound to insert the second terminus 56 of the arm 52 into a respective hole 40 to prevent expansion of the loop 36. The first terminus 54 of the arm 52 is configured to be depressed by a digit of the hand of the user to extract the second terminus 56 from the respective hole 40, positioning the loop 36 for expansion to release the wrists of the person.

In use, the hands of the person are inserted into the loop 36. The user pulls on the handle 16 to tighten the strap 14 around the wrists of the person. The first terminus 54 of the arm 52 can be depressed by the user to release the wrists of the person.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the elements is present, unless the context clearly requires that there be only one of the elements.

I claim:

1. A restraining device comprising:

a housing defining an interior space, the housing having a pair of apertures positioned therein, the apertures being positioned singly in a front end and a rear end of the housing;

a strap having a first end engaged to the housing, the strap extending from the housing loopedly back through the pair of apertures defining a loop, such that a second end of the strap is external to the housing, wherein the loop is configured for inserting hands of a person such that the strap is positioned around wrists of the person;

a handle engaged to the strap proximate to the second end, wherein the handle is configured for grasping a hand of a user, positioning the user for pulling on the handle for tightening the strap around the wrists of the person;

a locking unit engaged to the housing, positioned in the interior space, and being configured for selectively engaging the strap for preventing expansion of the loop; and a pair of plates, each plate being engaged to a respective opposed end of the handle, wherein the plates are configured for deterring, slippage of the hand of the user off of the handle.

2. The restraining device of claim 1, further including the housing having a top, a bottom, and opposed sides, the opposed sides tapering from proximate to the rear end to the front end such that the front end is circumferentially smaller than the rear end.

3. The restraining device of claim 1, wherein the hand cylindrically shaped.

4. The restraining device of claim 1, further including a grip engaged to the handle, wherein the grip is configured for enhancing a grasp of the hand of the user upon the handle.

5. The restraining device of claim 4, wherein the grip comprises rubber, silicone, or elastomer.

6. The restraining device of claim 1, wherein the strap comprises plastic.

7. The restraining device of claim 1, further including a connector engaged to the handle.

8. The restraining device of claim 7, wherein the connector comprises an eyebolt.

9. A restraining device comprising:

a housing defining an interior space, the housing having a pair of apertures positioned therein, the apertures being positioned singly in a front end and a rear end of the housing;

a strap having a first end engaged to the housing, the strap extending from the housing loopedly back through the pair of apertures defining a loop, such that a second end of the strap is external to the housing, wherein the loop is configured for inserting hands of a person such that the strap is positioned around wrists of the person;

a handle engaged to the strap proximate to the second end, wherein the handle is configured for grasping in a hand of a user, positioning the user for pulling on the handle for tightening the strap around the wrists of the person;

a locking unit, engaged to the housing, positioned in the interior space, and being configured for selectively engaging the strap for preventing expansion of the loop;

wherein the strap has a plurality of holes positioned therethrough and extending from proximate to the first end and the second end; and wherein the locking unit comprises an arm hingedly engaged to the housing, such that a first terminus of the arm is external to the housing and such that a second terminus of the arm is positioned in the interior space and for selectively inserting into a respective hole of the plurality of holes, the arm having a spring engaged thereto such that the arm hinges as the strap slides through the housing by action of the user pulling the handle, concurrent with tensioning of the spring, such that the spring is positioned for rebounding for inserting the second terminus of the arm into a respective hole for preventing expansion of the loop, wherein the first terminus of the arm is configured for depressing by a digit of the hand of the user for extracting the second terminus from the respective hole, positioning the loop for expansion for releasing the wrists of the person.

10. The restraining device of claim 9, wherein each hole is ovally shaped.

11. A restraining device comprising:

a housing defining an interior space, the housing having a pair of apertures positioned therein, the apertures being positioned singly in a front end and a rear end of the housing, the housing having a top, a bottom, and opposed sides, the opposed sides tapering from proximate to the rear end to the front end such that the front end is circumferentially smaller than the rear end;

a strap having a first end engaged to the housing, the strap extending from the housing loopedly back through the pair of apertures defining a loop, such that a second end of the strap is external to the housing, wherein the loop is configured for inserting hands of a person such that the strap is positioned around wrists of the person, the strap having a plurality of holes positioned therethrough and extending from proximate to the first end and the second end, each hole being ovally shaped, the strap comprising plastic;

a handle engaged to the strap proximate to the second end, wherein the handle is configured for grasping in a hand of a user, positioning the user for pulling on the handle for tightening the strap around the wrists of the person, the handle being cylindrically shaped;

a pair of plates, each plate being engaged to a respective opposed end of the handle, wherein the plates are configured for deterring slippage of the hand of the user off of the handle;

a grip engaged to the handle, wherein the grip is configured for enhancing a grasp of the hand of the user upon the handle, the grip comprising rubber, silicone, or elastomer;

a locking unit engaged to the housing, positioned in the interior space, and being configured for selectively engaging the strap for preventing expansion of the loop, the locking unit comprising an arm hingedly engaged to the housing, such that a first terminus of the arm is external to the housing and such that a second terminus of the arm is positioned in the interior space and for selectively inserting into a respective hole of the plurality of holes, the arm having a spring engaged thereto such that the arm hinges as the strap slides through the housing by action of the user pulling the handle, concurrent with tensioning of the spring, such that the spring is positioned for rebounding for inserting the second terminus of the arm into a respective hole for preventing expansion of the loop, wherein the first terminus of the arm is configured for depressing by a digit of the hand of the user for extracting the second terminus from the respective hole, positioning the loop for expansion for releasing the wrists of the person; and a connector engaged to the handle, the connector comprising an eyebolt.

* * * * *